United States Patent [19]

Desilets et al.

[11] Patent Number: 5,288,574
[45] Date of Patent: * Feb. 22, 1994

[54] PHTHALOCYANINE IMAGING MEMBERS AND PROCESSES

[75] Inventors: Denis Desilets, Mississauga; Trevor I. Martin, Burlington; Cheng-Kuo Hsiao, Mississauga, all of Canada; Terry L. Bluhm, Pittsford, N.Y.

[73] Assignee: Xerox Corporation, Stamford, Conn.

[*] Notice: The portion of the term of this patent subsequent to Apr. 7, 2009 has been disclaimed.

[21] Appl. No.: 944,632

[22] Filed: Sep. 14, 1992

[51] Int. Cl.⁵ .................. G03G 15/02; G03G 15/06; G03G 5/00; C09B 67/04
[52] U.S. Cl. .................................. 430/58; 430/57; 430/78; 430/135; 540/141
[58] Field of Search .......... 430/56, 57, 58, 78, 430/135; 540/141

[56] References Cited

U.S. PATENT DOCUMENTS

| | | | |
|---|---|---|---|
| 3,825,422 | 7/1974 | Gruber et al. | 96/1 PE |
| 4,265,990 | 5/1981 | Stolka et al. | 430/59 |
| 4,643,770 | 2/1987 | Hays | 106/23 |
| 4,728,592 | 3/1988 | Ohaku et al. | 430/59 |
| 4,898,799 | 2/1990 | Fujimaki et al. | 430/59 |
| 5,102,758 | 4/1992 | Kazmaier et al. | 430/58 |
| 5,206,359 | 4/1993 | Mayo et al. | 540/141 |

FOREIGN PATENT DOCUMENTS

| | | | |
|---|---|---|---|
| 0314100 | 3/1987 | European Pat. Off. | |
| 2183202 | 7/1990 | Japan | 430/78 |

Primary Examiner—Marion E. McCamish
Assistant Examiner—Stephen C. Crossan
Attorney, Agent, or Firm—Palazzo E. O.

[57] ABSTRACT

A layered photoconductive imaging member comprised of a supporting substrate, a photogenerating layer comprised of titanyl phthalocyanine photogenerating pigments and thereover a charge transport layer, and wherein said photogenerating pigments are prepared by a process which comprises the formation of a slurry comprised of dihalotitanium phthalocyanine in a mixture comprised of a trihaloacetic acid and an alkylene chloride; adding the resultant slurry to a mixture of an aliphatic alcohol and water enabling hydrolysis whereby Type X oxytitanium phthalocyanine is obtained; separating the Type X oxytitanium phthalocyanine from the slurry; and thereafter subjecting the Type X oxytitanium phthalocyanine obtained to treatment with a halobenzene, followed by the separation of Type IV oxytitanium phthalocyanine photogenerating pigments.

18 Claims, No Drawings

PHTHALOCYANINE IMAGING MEMBERS AND PROCESSES

BACKGROUND OF THE INVENTION

This invention is generally directed to imaging members, and more specifically to oxytitanium phthalocyanines and processes for the preparation thereof. Specifically, the present invention is directed to simple, economical processes for obtaining the Type IV polymorph of oxytitanium phthalocyanine from dichlorotitanium phthalocyanine and layered photoconductive members comprised of the aforementioned Type IV polymorph of oxytitanium phthalocyanine. In one embodiment, the process of the present invention comprises the mixing, or formation of a slurry of a dihalotitanium phthalocyanine, such as dichlorotitanium phthalocyanine, in a mixture comprised of a trihaloacetic acid and an alkylene halide; thereafter adding the resulting slurry to an aqueous aliphatic alcohol mixture to enable hydrolysis of the dihalotitanium phthalocyanine to Type X oxytitanium phthalocyanine; separating the Type X oxytitanium phthalocyanine therefrom; and converting the Type X oxytitanium phthalocyanine obtained to Type IV oxytitanium phthalocyanine by the slurrying thereof with a halobenzene, such as chlorobenzene. Layered imaging members containing the Type IV oxytitanium phthalocyanine obtained by the processes of the present invention possess a number of advantages, such as high photoconductivity, low dark decay and excellent stability in xerographic cycling, for example from about 1 percent to about 20 percent cycle down after 50,000 imaging cycles. In an embodiment, the process of the present invention comprises the preparation of the Type IV oxytitanium phthalocyanine by the hydrolysis of dichlorotitanium phthalocyanine, preferably purified by slurrying in a solvent like dimethylformamide; the hydrolysis being accomplished by adding a slurry of the aforementioned dichlorotitanium phthalocyanine in trifluoroacetic acid and methylene chloride to a mixture comprised of methanol and water, and separating the Type X oxytitanium phthalocyanine therefrom by, for example, filtration. The obtained Type X oxytitanium phthalocyanine is converted to the desired Type IV by slurrying in chlorobenzene. The Type IV oxytitanium phthalocyanine obtained can be selected as an organic photogenerator pigment for use in photoresponsive imaging members containing charge, especially hole transport, layers comprised of aryl amine hole transport molecules. The aforementioned photoresponsive imaging members can be negatively charged when the photogenerating layer is situated between the hole transport layer and the substrate, or positively charged when the hole transport layer is situated between the photogenerating layer and the supporting substrate. The layered photoconductor imaging members can be selected for a number of different known imaging and printing processes including, for example, electrophotographic imaging processes, especially xerographic imaging and printing processes wherein negatively charged or positively charged images are rendered visible with toner compositions of the appropriate charge. Generally, the imaging members are sensitive in the wavelength regions of from about 700 to about 850 nanometers, thus diode lasers can be selected as the light source.

Many processes for the preparation of oxytitanium phthalocyanines are known, such as the sulfuric acid pasting methods, reference for example EPO publication 314,100. In the aforementioned Mita EPO Patent Publication 314,100, there is illustrated the synthesis of oxytitanium phthalocyanine, see for example pages 5 and 6, by, for example, the reaction of titanium alkoxides and diiminoisoindolene in quinoline or an alkylbenzene, and the subsequent conversion thereof to an alpha type pigment (Type II polymorph) by an acid pasting process, whereby the synthesized pigment is dissolved in concentrated sulfuric acid, and the resultant solution is poured onto ice to precipitate the alpha form, which is filtered and washed with methylene chloride. This pigment, which was blended with varying amounts of metal free phthalocyanine, could be selected as the electric charge generating layer in layered photoresponsive imaging members.

In Japanese 62-256865 there is disclosed, for example, a process for the preparation of pure Type I oxytitanium phthalocyanine involving the addition of titanium tetrachloride to a solution of phthalonitrile in an organic solvent which has been heated in advance to a temperature of from 160° to 300° C. In Japanese 62-256866, there is illustrated, for example, a method of preparing the aforementioned polymorph which involves the rapid heating of a mixture of phthalonitrile and titanium tetrachloride in an organic solvent at a temperature of from 100° to 170° C. over a time period which does not exceed one hour. In Japanese 62-256867, there is described, for example, a process for the preparation of pure Type II (alpha polymorph) oxytitanium phthalocyanine, which involves a similar method to the latter except that the time to heat the mixture at from 100° to 170° C., is maintained for at least two and one half hours. Types I and II, in the pure form obtained by the processes of the above publications, apparently afforded layered photoresponsive imaging members with excellent electrophotographic characteristics. Also, as mentioned in the textbook Phthalocyanine Compounds by Moser and Thomas, the disclosure of which is totally incorporated herein by reference, polymorphism or the ability to form distinct solid state forms is well known in phthalocyanines. For example, metal-free phthalocyanine is known to exist in at least 5 forms designated as alpha, beta, pi, X and tau. Copper phthalocyanine crystal forms known as alpha, beta, gamma, delta, epsilon and pi are also described. These different polymorphic forms are usually distinguishable on the basis of differences in the solid state properties of the materials which can be determined by measurements, such as differential scanning calorimetry, infrared spectroscopy, ultraviolet-visible-near infrared spectroscopy, and especially X-ray powder diffraction (XRPD) techniques. There appears to be general agreement on the nomenclature used to designate specific polymorphs of commonly used pigments such as metal-free and copper phthalocyanine. However, this does not appear to be the situation with oxytitanium phthalocyanines as different nomenclature is selected in a number of instances. For example, reference is made to alpha, beta, A, B, C, y, and m forms of oxytitanium phthalocyanine with different names being used for the same form in some situations. Five distinct crystal forms oxytitanium phthalocyanines are Types X, I, II, III, and IV.

In Sanyo-Shikiso Japanese 63-20365/86, reference is made to the known crystal forms alpha and beta oxytitanium phthalocyanines (Types II and I, respectively, it is believed), which publication also describes a process for the preparation of a new form of oxytitanium phthalocyanine. This publication appears to suggest the use of the unnamed oxytitanium phthalocyanine as a pigment and its use as a recording medium for optical discs. This apparently new form was prepared by treating acid pasted oxytitanium phthalocyanine (Type II form, it is believed) with a mixture of chlorobenzene and water at about 50° C.

In U.S. Pat. No. 4,728,592, there is illustrated, for example, the use of alpha type oxytitanium phthalocyanine (Type II) in an electrophotographic device having sensitivity over a broad wavelength range of from 500 to 900 nanometers. This form was prepared by the treatment of dichlorotitanium phthalocyanine with concentrated aqueous ammonia and pyridine at reflux for 1 hour. Also described in the aforementioned patent is a beta type oxytitanium phthalocyanine (Type I) pigment, which is believed to provide a much poorer quality photoreceptor.

In Konica Japanese 64-17066/89, there is disclosed, for example, the use of a new crystal modification of oxytitanium phthalocyanine prepared from alpha type pigment (Type II) by milling it in a sand mill with salt and polyethylene glycol. This pigment apparently had a strong XRPD peak at a value of 2 theta of 27.3 degrees. This publication also discloses that this new form differs from alpha type pigment (Type II) in its light absorption and shows a maximum absorbance at 817 nanometers compared to alpha type, which has a maximum at 830 nanometers. The aforementioned Konica publication also discloses the use of this new form of oxytitanium phthalocyanine in a layered electrophotographic device having high sensitivity to near infrared light of 780 nanometers. The new form is indicated to be superior in this application to alpha type oxytitanium phthalocyanine (Type II). Further, this new form is also described in U.S. Pat. No. 4,898,799 and in a paper presented at the Annual Conference of Japan Hardcopy in July 1989. In this paper, this same new form is referred to as Type Y, and reference is also made to Types I, II, and III as A, B, and C, respectively.

Processes for the preparation of specific polymorphs of oxytitanium phthalocyanine, which require the use of a strong acid such as sulfuric acid, are known, and these processes, it is believed, are not easily scalable for manufacturing purposes and generally lead to some decomposition of the organic pigment. One process as illustrated in Konica Japanese Laid Open on Jan. 20, 1989 as 64-17066 (U.S. Pat. No. 4,643,770 appears to be its equivalent), the disclosure of which is totally incorporated herein by reference, involves, for example, the reaction of titanium tetrachloride and phthalonitrile in 1-chloronaphthalene solvent to produce dichlorotitanium phthalocyanine which is then subjected to hydrolysis by ammonia water to enable the formation of the Type II polymorph. This phthalocyanine is preferably treated with an electron releasing solvent such as 2-ethoxyethanol, dioxane, or N-methylpyrrolidone, followed by subjecting the alpha oxytitanium phthalocyanine to milling at a temperature of from 50° to 180° C. In a second method described in the aforementioned Japanese Publication, there is disclosed the preparation of alpha type oxytitanium phthalocyanine with sulfuric acid. A method for the preparation of Type IV oxytitanium phthalocyanine involves the addition of an aromatic hydrocarbon, such as chlorobenzene solvent, to an aqueous suspension of an oxytitanium phthalocyanine prepared by the well known acid pasting process, and heating the resultant suspension to about 50° C. as disclosed in Sanyo-Shikiso Japanese 63-20365, Laid Open in Jan. 28, 1988. In Japanese 171771/1986, Laid Open Aug. 2, 1986, there is disclosed the purification of metal phthalocyanines by treatment with N-methylpyrrolidone.

To obtain an oxytitanium phthalocyanine based photoreceptor having high sensitivity to near infrared light and especially to provide a photoreceptor which can be repeatedly cycled in the xerographic process, it is believed necessary to control not only the purity and chemical structure of the pigment, as is generally the situation with organic photoconductors, but also to prepare the pigment in the correct crystal form. The disclosed processes used to prepare specific crystal forms of oxytitanium phthalocyanine are either complicated and difficult to control as in the preparation of pure Types I and II pigment by careful control of the synthesis parameters by the processes described in Mitsubishi Japanese 62-25685, -6 and -7, or involve harsh treatment such as sand milling at high temperature, reference Konica U.S. Pat. No. 4,898,799; or dissolution of the pigment in a large volume of concentrated sulfuric acid, a solvent which is known to cause decomposition of metal phthalocyanines by sulfonation or demetallization, reference Sanyo-Shikiso Japanese 63-20365 and Mita EPO 314,100.

Generally, layered photoresponsive imaging members are described in a number of U.S. patents, such as U.S. Pat. No. 4,265,900, the disclosure of which is totally incorporated herein by reference, wherein there is illustrated an imaging member comprised of a photogenerating layer, and an aryl amine hole transport layer. Examples of photogenerating layer components include trigonal selenium, metal phthalocyanines, oxymetallo phthalocyanines, and metal free phthalocyanines. Additionally, there is described in U.S. Pat. No. 3,121,006 a composite xerographic photoconductive member comprised of finely divided particles of a photoconductive inorganic compound dispersed in an electrically insulating organic resin binder. The binder materials disclosed in the '006 patent comprise a material which is incapable of transporting for any significant distance injected charge carriers generated by the photoconductive particles.

In a copending application U.S. Ser. No. 537,714, the disclosure of which is totally incorporated herein by reference, there are illustrated photoresponsive imaging members with photogenerating oxytitanium phthalocyanine layers prepared by vacuum deposition. It is indicated in this copending application that the imaging members comprised of the vacuum deposited oxytitanium phthalocyanines and aryl amine hole transporting compounds exhibit superior xerographic performance, since low dark decay characteristics result and higher photosensitivity is observed, particularly in comparison to several prior art imaging members prepared by solution coating or spray coating, reference, for example, U.S. Pat. No. 4,429,029 mentioned herein.

In U.S. Pat. No. 5,153,313, the disclosure of which is totally incorporated herein by reference, there is illustrated a process for the preparation of phthalocyanine composites which comprises adding a metal free phthalocyanine, a metal phthalocyanine, an oxymetallo phthalocyanine or mixtures thereof to a solution of trifluoroacetic acid and a monohaloalkane; adding to the resulting mixture an oxytitanium phthalocyanine; adding the resulting solution to a mixture that will enable precipitation of said composite; and recovering the phthalocyanine composite precipitated product.

In U.S. Pat. No. 5,200,359 there is disclosed a process for the preparation of oxytitanium phthalocyanine which comprises the treatment of Type X oxytitanium phthalocyanine with a halobenzene; and more specifically, in one embodiment of this copending application there are provided processes for the preparation of Type X oxytitanium phthalocyanine which comprises the solubilization of a Type I oxytitanium phthalocyanine, which can be obtained by the reaction of 1,3-diiminoisoindoline and titanium tetrabutoxide in the presence of a solvent, such as chloronaphthalene, reference U.S. Pat. No. 5,189,156 the disclosure of which is totally incorporated herein by reference, in a mixture of trifluoroacetic acid and methylene chloride, precipitation of the desired Type X oxytitanium phthalocyanine, separation by, for example, filtration, and thereafter subjecting the product to washing with fluorobenzene; more specifically, U.S. Pat. No. 5,189,156 discloses a process for the preparation of oxytitanium phthalocyanine which comprises the reaction of a titanium tetraalkoxide and 1,3-diiminoisoindoline in the presence of a halonaphthalene solvent; dissolving the resulting Type I oxytitanium phthalocyanine in a haloacetic acid and an alkylene halide; adding the resulting mixture slowly to a cold alcohol solution; and thereafter isolating the resulting Type X oxytitanium phthalocyanine with an average volume particle size diameter of from about 0.02 to about 0.5 micron; and U.S. Pat. No. 5,189,155 discloses a process for the preparation of Type I oxytitanium phthalocyanine which comprises the reaction of titanium tetraalkoxide and 1,3-diiminoisoindoline in the presence of a halonaphthalene solvent. The product can be identified by various known means including X-ray powder diffraction (XRPD). Also, in U.S. Pat. No. 5,166,339 there is disclosed a process for the preparation of titanyl phthalocyanine which comprises dissolving a titanyl phthalocyanine in a solution of trifluoroacetic acid and methylene chloride; adding the resultant solution to a solvent system that will enable precipitation; and separating the desired titanyl phthalocyanine from the solution followed by an optional washing; U.S. Pat. No. 5,182,382 discloses a process for the preparation of titanyl phthalocyanine Type X which comprises dissolving titanyl phthalocyanine Type I in a solution of trifluoroacetic acid and methylene chloride; adding the resultant solution to a solvent enabling precipitation of Type X titanyl phthalocyanine; separating the titanyl phthalocyanine Type X from the solution; followed by a first washing with an organic solvent and a second washing with water; and thereafter a solvent treatment with fluorobenzene; and U.S. Pat. No. 5,164,493 discloses a process for the preparation of titanyl phthalocyanine which comprises the reaction in a solvent of phthalonitrile and diiminoisoindoline with titanium tetraalkoxide.

The disclosures of each of the aforementioned copending patent applications and patents are totally incorporated herein by reference.

SUMMARY OF THE INVENTION

It is an object of the present invention to provide processes for the preparation of oxytitanium phthalocyanines with many of the advantages illustrated herein.

Another object of the present invention is to provide a process for the preparation of the Type IV oxytitanium phthalocyanine which involves a single, easy polymorphic conversion step and does not require the prior preparation of the Type I, Type II or Type III polymorphs of oxytitanium phthalocyanine or any mixtures thereof as precursors or intermediates.

It is yet another object of the present invention to provide economically scalable processes for the preparation of oxytitanium phthalocyanine by hydrolysis of a dihalotitanium phthalocyanine.

Another object of the present invention relates to the preparation of stable, highly photosensitive Type IV oxytitanium phthalocyanine.

Moreover, another object of the present invention relates to the preparation of stable, highly photosensitive Type IV oxytitanium phthalocyanine of high purity, for example exceeding about 99 percent, and the use thereof in electrophotographic imaging processes.

Another object of the present invention in an embodiment thereof resides in the preparation of the Type IV polymorph of oxytitanium phthalocyanine, having a small particle size of about 0.04 to about 0.1 micron which is advantageous for the preparation of electrophotographic devices since, for example, the prepared polymorph can be easily dispersed in coating compositions.

Yet another object of the present invention is the provision of processes for the preparation of Type IV oxytitanium phthalocyanine without use of strong acid or base, heating or cooling thereby avoiding, or minimizing decomposition of the titanium complex like, for example, in the known acid pasting processes which generally leads to some decomposition by sulfonation or demetallization.

Further, in another object of the present invention there are provided processes for the preparation of Type IV oxytitanium phthalocyanine that has excellent photosensitivity to incident light in the 600 to 850 nanometer range when utilized in layered imaging members.

A further object of the present invention resides in the provision of highly sensitive, stable photoresponsive imaging members with an aryl amine hole transport layer, and a photogenerator layer comprised of Type IV oxytitanium phthalocyanine pigment obtained by the processes illustrated herein.

In embodiments, the present invention relates to processes for the preparation of oxytitanium phthalocyanines and photoresponsive imaging members thereof. More specifically, in embodiments of the present invention there are provided processes for the preparation of the Type IV polymorph of oxytitanium phthalocyanine which comprises the formation of a slurry comprised of a dihalotitanium phthalocyanine, preferably dichlorotitanium phthalocyanine, in a mixture of trifluoroacetic acid and methylene chloride; adding the slurry to a hydrolysis mixture comprised of water and an alcohol, such as an aliphatic alcohol with from about 1 to about 20, and preferably 6 carbon atoms like methanol; isolating by filtration the Type X oxytitanium phthalocyanine obtained; thereafter forming a mixture, or slurry of the Type X with a halobenzene, like chlorobenzene; and separating the Type IV obtained. The products can be identified by various known means including X-ray powder diffraction (XRPD).

One embodiment of the present invention is directed to processes for the preparation of Type IV oxytitanium phthalocyanine, as determined by X-ray powder diffraction, which comprises forming a slurry of dichlorotitanium phthalocyanine in a mixture of trifluoroacetic acid and methylene chloride; adding the resulting slurry to a stirred hydrolysis mixture composed of water and an aliphatic alcohol, with from 1 to about 12 carbon atoms like methanol, or mixtures thereof; separating the resulting precipitate of Type X by, for example, vacuum filtration through a glass fiber filter in a Buchner funnel or centrifugation; and slurrying the Type X obtained in a halobenzene, like chlorobenzene, and isolating the Type IV by, for example, filtration or centrifugation.

As the dispersion medium for the dihalotitanium phthalocyanine, there can be selected trihaloacetic acids, including trifluoroacetic acid or trichloroacetic acid, and preferably an alkylene halide, with 1 to about 12 carbon atoms, such as methylene chloride, chloroform, trichloroethylene, bromoform and other short chain halogenated alkanes and alkenes with from 1 to about 6 carbon atoms and from 1 to about 14 halogen atoms including chlorofluorocarbons and hydrochlorofluorocarbons and other organic alkyl halides which are miscible with strong organic acids, in a volume ratio of, for example, from about 1 part of acid to about 1 to 20 parts of the alkylene halide and in a concentration of, for example, from about 1 to 100 milliliters of mixture per gram of dihalotitanium phthalocyanine. In an embodiment of the present invention, a preferred mixture is comprised of trifluoroacetic acid and methylene chloride in a volume ratio of from about 1 part of acid to about 4 parts of methylene chloride in a concentration of about 10 milliliters of mixture per gram of dihalotitanium phthalocyanine.

Subsequent to the above, and stirring for an effective period of time of, for example from about 1 minute to about two hours, the resulting slurry is added to a mixture that will enable hydrolysis of the dichlorotitanium phthalocyanine to the Type X oxytitanium phthalocyanine which hydrolysis mixture is comprised of water and an alcohol such as methanol, ethanol, propanol, isopropanol, butanol, pentanol and the like in a volume ratio of from about 65 percent of alcohol and 35 percent of water to about 35 percent of alcohol and 65 percent of water; followed by filtration of the Type X oxytitanium phthalocyanine polymorph and slurrying in various haloaromatic solvents such as, for example, chlorobenzene, to obtain the Type IV polymorph. The resulting Type IV oxytitanium phthalocyanine can then be dried by, for example, heating, yielding dark blue pigment of the desired oxytitanium phthalocyanine, Type IV polymorph, as determined by XRPD analysis.

In an embodiment of the present invention, there is provided a process for the preparation of the Type IV polymorph of oxytitanium phthalocyanine which comprises (1) slurrying for an effective time period by, for example, a vigorous magnetic or mechanic stirring the dichlorotitanium phthalocyanine in a mixture comprised of trifluoroacetic acid and methylene chloride in a volume ratio of about 1 part of acid to about 1 to 20 parts of methylene chloride in a concentration of from about 1 to 100 milliliters of mixture per gram of dichlorotitanium phthalocyanine and stirring the mixture for an effective period of time, for example from about 1 minute to about 2 hours, and in an embodiment about 15 minutes, at a temperature of from about 0° C. to about 30° C.; (2) pouring or adding the resultant slurry into a rapidly stirred hydrolysis mixture comprised of methanol and water in a volume ratio of from about 65 percent of methanol and 35 percent of water to about 35 percent of methanol and 65 percent of water; this hydrolysis mixture being in a volume ratio of from about 1 part of the aforementioned pigment slurry to 2 parts of the hydrolysis mixture to about 1 part pigment slurry to 50 parts of the hydrolysis mixture at a temperature of from about −5 to about 5° C. over a period of from about 1 minute to about 2 hours to ensure rapid efficient mixing by, for example, a vigorous magnetic or mechanical stirring; in an embodiment, the hydrolysis mixture was stirred at a rate sufficient to form a deep vortex in the reaction vessel, and the pigment slurry was poured in a slow stream, for example about 20 minutes, into the side of the vortex; (3) isolating the Type X oxytitanium phthalocyanine obtained; and (4) slurrying the Type X polymorph in chlorobenzene for an effective period of time from 1 minute to 2 hours to enable complete conversion to Type IV oxytitanium phthalocyanine. The Type IV oxytitanium phthalocyanine so obtained possesses excellent xerographic characteristics, for example an $E_{\frac{1}{2}}$ equal to 4.6 erg/cm$^2$ at 780 nanometers, a decay of 11 volts/second, and a percent discharge at 5 and 10 ergs/cm$^2$ of 51 and 62 percent, respectively, when the aforementioned Type IV was selected as a photogenerator in a layered imaging member, such as that of Example III. The final product can be obtained after the solid has been dried at a temperature of from about 25° C. to about 150° C. for a time of 1 hour to about 24 hours, for example either in air or under a vacuum. A yield corresponding from about 75 percent to about 95 percent can be obtained. The polymorphic form of the final pigment was determined by XRPD analysis.

A typical small scale conversion reaction was accomplished in an embodiment of the present invention as follows:

2.2 grams of dichlorotitanium phthalocyanine were added to 20 milliliters of a 1:4 mixture (V/V) of trifluoroacetic acid in methylene chloride with stirring in a 25 milliliter Erlenmeyer flask at room temperature and stirring was continued for 15 minutes. The resultant dark green suspension was then added dropwise into 200 milliliters of a 1:1 (V/V) mixture of methanol and water in a 250 milliliter Erlenmeyer flask with vigorous stirring at 0° to 2° C. over 20 minutes. The resultant dark blue suspension was stirred at room temperature for an additional 30 minutes and then was filtered through a glass fiber filter (Whatman GF/A grade). The resultant wet filter cake was transferred to a 250 milliliter flask and was redispersed in 100 milliliters of methanol. The resulting dispersion was stirred for 30 minutes, then was refiltered as above, and the resulting solid was slurried in 125 milliliters of deionized boiling water and filtered. After a second boiling water slurry, the Type X oxytitanium phthalocyanine obtained, as identified by XRPD, was slurried in 125 milliliters of chlorobenzene for 40 minutes and the Type IV separated therefrom by, for example, filtration. The solid was dried at 70° C. for 2 hours to yield 1.8 grams of dark blue pigment. The product was identified as Type IV oxytitanium phthalocyanine on the basis of its XRPD pattern.

One embodiment of the present invention is also directed to a process for the preparation of Type IV oxytitanium phthalocyanine in which the dichlorotitanium phthalocyanine is purified by a slurry in a solvent like dimethylformamide prior to being hydrolyzed. The Type IV oxytitanium phthalocyanine obtained thereafter by the process described in this invention shows excellent improvement in xerographic characteristics, for example an $E_{\frac{1}{2}}$ equal to 2.4 erg/cm$^2$ at 780 nanometers, a dark decay of 11 volts/second, and a percent discharge at 5 and 10 ergs/cm$^2$ of 68 and 76 percent, respectively, when the aforementioned Type IV was selected as a photogenerator in a layered imaging member, such as that of Example III.

In an embodiment of the present invention, there is also provided a process for the further improvement of the xerographic properties of the obtained Type IV oxytitanium phthalocyanine, which comprises dissolving the Type IV oxytitanium phthalocyanine in a solvent mixture comprised of trihaloacetic acids, including trifluoroacetic acid or trichloroacetic acid and an alkylene halide cosolvent, such as methylene chloride, chloroform, trichloroethylene, bromoform and other short chain halogenated alkanes and alkenes with from 1 to about 6 carbon atoms and from 1 to about 14 halogen atoms including chlorofluorocarbons and hydrochlorofluorocarbons; and other organic alkyl halide solvents which are miscible with strong organic acids and which will effectively dissolve the oxytitanium phthalocyanine in effective amounts; in a volume ratio of, for example, from about 1 part of acid to about 1 to 20 parts of the alkylene halide cosolvent such as methylene chloride and in concentrations of, for example, from about 1 to 100 milliliters of mixed solvent per gram of Type IV oxytitanium phthalocyanine. In an embodiment of the present invention, a preferred solvent mixture is comprised of trifluoroacetic acid and methylene chloride in a volume ratio of from about 1 part of acid to about 4 parts of methylene chloride.

Subsequent to the above and stirring for an effective period of time of, for example, from about 1 minute to about two hours, the resulting solution is added to a mixture that will enable precipitation of the Type X oxytitanium phthalocyanine, which precipitation mixture is comprised of water and an alcohol such as methanol, ethanol, propanol, isopropanol, butanol, pentanol and the like in a volume ratio of from about 65 percent of alcohol and 35 percent of water to about 35 percent of alcohol and 65 percent of water; followed by filtration of the Type X oxytitanium phthalocyanine polymorph and slurrying in various haloaromatic solvents, such as, for example, chlorobenzene, to obtain the Type IV polymorph. The resulting Type IV oxytitanium phthalocyanine can then be dried by, for example, heating, yielding dark blue pigment of the desired Type IV oxytitanium phthalocyanine as determined by XRPD analysis. The Type IV oxytitanium phthalocyanine so obtained shows excellent improvement in xerographic characteristics, for example an $E_{\frac{1}{2}}$ equal to 1.8 erg/cm$^2$ at 780 nanometers, a dark decay of 11 volts/second, and a percent discharge at 5 and 10 ergs/cm$^2$ of 70 and 74 percent, respectively, when the aforementioned Type IV was selected as a photogenerator in a layered imaging member, such as that of Example III.

A typical small scale purification was accomplished in an embodiment of the present invention as follows:

Two grams of Type IV oxytitanium phthalocyanine, which was obtained by the hydrolysis of dichlorotitanium phthalocyanine, were added to 20 milliliters of a 1:4 mixture (V/V) of trifluoroacetic acid in methylene chloride with stirring in a 25 milliliter Erlenmeyer flask at room temperature for 5 minutes. The resultant dark green solution, which did not contain any undissolved material, was then added dropwise into 200 milliliters of a 1:1 mixture of methanol and water in a 250 milliliter Erlenmeyer flask with vigorous stirring at 0° to 2° C. over 20 minutes. The resultant dark blue suspension was stirred at room temperature for an additional 30 minutes and then was filtered through a glass fiber filter (Whatman GF/A grade). The resultant wet filter cake was transferred to a 250 milliliter flask and was redispersed in 100 milliliters of methanol. The resulting dispersion was stirred for 30 minutes, then was refiltered as above, and the resulting solid was slurried in 125 milliliters of deionized boiling water and filtered. After a second boiling water slurry, the Type X oxytitanium phthalocyanine obtained, as identified by XRPD, was slurried in 125 milliliters of chlorobenzene for 40 minutes and the Type IV separated therefrom by, for example, filtration. The solid was dried at 70° C. for 2 hours to yield 1.8 grams of dark blue pigment. The product was identified as Type IV oxytitanium phthalocyanine on the basis of its XRPD pattern.

Numerous different layered photoresponsive imaging members with the phthalocyanine pigments obtained by the processes, especially hydrolysis of the present invention, can be fabricated. In one embodiment, thus the layered photoresponsive imaging members can be comprised of a supporting substrate, a charge transport layer, especially an aryl amine hole transport layer, and situated therebetween a photogenerator layer comprised of oxytitanium phthalocyanine Type IV. Another embodiment of the present invention is directed to positively charged layered photoresponsive imaging members comprised of a supporting substrate, a charge transport layer, especially an aryl amine hole transport layer, and as a top overcoating, the Type IV oxytitanium phthalocyanine pigment obtained with the hydrolysis processes of the present invention. Moreover, there is provided in accordance with the present invention an improved negatively charged photoresponsive imaging member comprised of a supporting substrate, a thin adhesive layer, a Type IV oxytitanium phthalocyanine obtained by the hydrolysis processes of the present invention photogenerator dispersed in a polymeric resinous binder, and as a top layer, aryl amine hole transporting molecules dispersed in a polymeric resinous binder.

The photoresponsive imaging members of the present invention can be prepared by a number of known methods, the process parameters and the order of coating of the layers being dependent on the member desired. The imaging members suitable for positive charging can be prepared by reversing the order of deposition of photogenerator and hole transport layers. The photogenerating and charge transport layers of the imaging members can be coated as solutions or dispersions onto selective substrates by the use of a spray coater, dip coater, extrusion coater, roller coater, wire-bar coater, slot coater, doctor blade coater, gravure coater, and the like, and dried at from 40° to about 200° C. for from 10 minutes to several hours under stationary conditions or in an air flow. The coating is accomplished in such a manner that the final coating thickness is from 0.01 to about 30 microns after it has been dried. The fabrication conditions for a given layer will be tailored to achieve optimum performance and cost in the final device.

Imaging members with the oxytitanium phthalocyanine pigment of the present invention are useful in various electrostatographic imaging and printing systems, particularly those conventionally known as xerographic processes. Specifically, the imaging members of the present invention are useful in xerographic imaging processes wherein the oxytitanium phthalocyanine pigment absorbs light of a wavelength of from about 600 nanometers to about 900 nanometers. In these known processes, electrostatic latent images are initially formed on the imaging member followed by development, and thereafter transferring the image to a suitable substrate.

Moreover, the imaging members of the present invention can be selected for electronic printing processes with gallium arsenide light emitting diode (LED) arrays which typically function at wavelengths of from 660 to about 830 nanometers.

DESCRIPTION OF EMBODIMENTS

A negatively charged photoresponsive imaging member of the present invention comprised of a supporting conducting substrate coated with a charge blocking layer comprised, for example, of a silane layer or a mixed silane/zirconium oxide layer, an optional solution coated adhesive layer thereover comprised, for example, of a polyester 49,000 available from Goodyear Chemical, a photogenerator layer in contact with the adhesive layer and comprised of Type IV oxytitanium phthalocyanine obtained by the hydrolysis process of the present invention optionally dispersed in an inactive resinous binder, and a charge transport layer comprised of N,N'-diphenyl-N,N'-bis(3-methylphenyl)-1,1'-biphenyl-4,4'-diamine dispersed in a polycarbonate resinous binder.

Substrate layers selected for the imaging members of the present invention can be opaque or substantially transparent, and may comprise any suitable material having the requisite mechanical properties. Thus, the substrate may comprise a layer of insulating material including inorganic or organic polymeric materials, such as MYLAR ® a commercially available polymer, MYLAR ® containing titanium, a layer of an organic or inorganic material having a semiconductive surface layer such as indium tin oxide or aluminum arranged thereon, or a conductive material inclusive of aluminum, chromium, nickel, brass or the like. The substrate may be flexible, seamless, or rigid, and many have a number of many different configurations, such as for example a plate, a cylindrical drum, a scroll, an endless flexible belt and the like. In one embodiment, the substrate is in the form of a seamless flexible belt. In some situations, it may be desirable to coat on the back of the substrate, particularly when the substrate is a flexible organic polymeric material, an anticurl layer, such as for example polycarbonate materials commercially available as MAKROLON ®.

The thickness of the substrate layer depends on many factors, including economical considerations, thus this layer may be of substantial thickness, for example over 3,000 microns, or of minimum thickness providing there are no adverse effects on the system. In one embodiment, the thickness of this layer is from about 75 microns to about 300 microns.

With further regard to the imaging members, the photogenerator layer is comprised of the Type IV oxytitanium phthalocyanine pigment obtained preferably by the hydrolysis processes of the present invention dispersed in resinous binders. Generally, the thickness of the photogenerator layer depends on a number of factors, including the thicknesses of the other layers and the amount of photogenerator material contained in this layer. Accordingly, this layer can be of a thickness of from about 0.05 micron to about 10 microns when the oxytitanium phthalocyanine photogenerator composition is present in an amount of from about 5 percent to about 100 percent by volume. In one embodiment, this layer is of a thickness of from about 0.1 micron to about 1 micron when the photogenerator composition is present in this layer in an amount of 30 to 75 percent by volume. The maximum thickness of this layer in an embodiment is dependent primarily upon factors, such as photosensitivity, electrical properties and mechanical considerations. The charge generator layer can be obtained by dispersion coating the oxytitanium phthalocyanine obtained by the processes of the present invention, and a binder resin with a suitable solvent. The binder may be omitted. The dispersion can be prepared by mixing and/or milling the oxytitanium phthalocyanine in equipment, such as paint shakers, ball mills, sand mills and attritors. Common grinding media such as glass beads, steel balls or ceramic beads may be used in this equipment. A binder resin may be selected from a wide number of polymers such as poly(vinyl butyral), poly(vinyl carbazole), polyesters, polycarbonates, poly(vinyl chloride), polyacrylates and methacrylates, copolymers of vinyl chloride and vinyl acetate, phenoxy resins, polyurethanes, poly(vinyl alcohol), polyacrylonitrile, polystyrene, and the like. The solvents to dissolve these binders depend upon the particular resin. In embodiments of the present invention, it is desirable to select solvents that do not effect the other coated layers of the device. Examples of solvents useful for coating oxytitanium phthalocyanine dispersions to form a photogenerator layer are ketones, alcohols, aromatic hydrocarbons, halogenated aliphatic hydrocarbons, ethers, amines, amides, esters, and the like. Specific examples are cyclohexanone, acetone, methyl ethyl ketone, methanol, ethanol, butanol, amyl alcohol, toluene, xylene, chlorobenzene, carbon tetrachloride, chloroform, methylene chloride, trichloroethylene, tetrahydrofuran, dioxane, diethyl ether, dimethylformamide, dimethylacetamide, butyl acetate, ethyl acetate, methoxyethyl acetate, and the like.

The coating of the oxytitanium phthalocyanine dispersion in embodiments of the present invention can be accomplished with spray, dip or wire bar methods such that the final dry thickness of the charge generator layer is from 0.01 to 30 microns and preferably from 0.1 to 15 microns after being dried at 40° to 150° C. for 5 to 90 minutes.

Also, illustrative examples of polymeric binder resinous materials that can be selected for the photogenerator pigments include those polymers as disclosed in U.S. Pat. No. 3,121,006, the disclosure of which is totally incorporated herein by reference.

As a blocking layer present on the substrate, there can be selected various known silanes or silane/zirconium oxide mixtures, polyamides or polyurethanes. This layer is of a thickness of from about 0.01 micron to 10 microns, and preferably from 0.02 micron to 0.20 micron.

As optional adhesives, there can be selected various known substances inclusive of polyesters, polyamides, poly(vinyl butyral), poly(vinyl alcohol), polyurethane and polyacrylonitrile. This layer is of a thickness of from about 0.05 micron to 1 micron. Optionally, this layer may contain conductive and nonconductive particles such as zinc oxide, titanium dioxide silicon nitride, carbon black, and the like to provide, for example, in embodiments of the present invention desirable electrical and optical properties.

Aryl amines selected for the charge transporting layer which is generally of a thickness of from about 5 microns to about 75 microns, and preferably of a thickness of from about 10 microns to about 40 microns, include molecules of the following formula

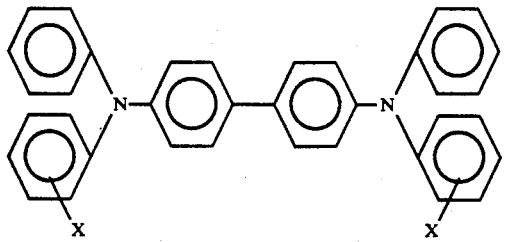

dispersed in a highly insulating and transparent organic resinous binder wherein X is an alkyl group or a halogen, especially those substituents selected from the group consisting of (ortho) $CH_3$, (para) $CH_3$, (ortho) Cl, (meta) Cl, and (para) Cl.

Examples of specific aryl amines are N,N'-diphenyl-N,N'-bis(alkylphenyl)-1,1-biphenyl-4,4'-diamine wherein alkyl is selected from the group consisting of methyl, such as 2-methyl, 3-methyl and 4-methyl, ethyl, propyl, butyl, hexyl, and the like. With chloro substitution, the amine is N,N'-diphenyl-N,N'-bis(halophenyl)-1,1'-biphenyl-4,4'-diamine wherein halo is 2-chloro, 3-chloro or 4-chloro. Other known hole transporting compounds can be selected.

Examples of the highly insulating and transparent resinous materials or inactive resinous binders for the transport layers include components such as those described in U.S. Pat. No. 3,121,006, the disclosure of which is totally incorporated herein by reference. Specific examples of organic resinous materials include polycarbonates, acrylate polymers, vinyl polymers, cellulose polymers, polyesters, polysiloxanes, polyamides, polyurethanes, epoxies, and block, random or alternating copolymers thereof. Preferred electrically inactive binders are comprised of polycarbonate resins having a molecular weight of from about 20,000 to about 100,000 with a molecular weight of from about 50,000 to about 100,000 being particularly preferred. Generally, the resinous binder contains from about 10 to about 75 percent by weight of the active material corresponding to the foregoing formula, and preferably from about 35 percent to about 50 percent of this material.

Also, included within the scope of the present invention are methods of imaging and printing with the photoresponsive devices illustrated herein. These methods generally involve the formation of an electrostatic latent image on the imaging member, followed by developing the image with a toner composition, reference U.S. Pat. Nos. 4,560,635; 4,298,697 and 4,338,390, the disclosures of which are totally incorporated herein by reference, subsequently transferring the image to a suitable substrate, and permanently affixing the image thereto. In those environments wherein the device is to be used in a printing mode, the imaging method involves the same steps with the exception that the exposure step can be accomplished with a laser device or image bar.

The invention will now be described in detail with reference to specific preferred embodiments thereof, it being understood that these Examples are intended to be illustrative only. The invention is not intended to be limited to the materials, conditions, or process parameters recited herein. The titanyl phthalocyanines obtained were identified primarily from their XRPD patterns.

EXAMPLE I

Synthesis of Dichlorotitanium Phthalocyanine

Dichlorotitanium phthalocyanine, an available material, can be prepared by following the process described in Inorganic Chemistry, Volume 4, pages 111 to 112 (1965) or using the process described in Example II of U.S. Pat. No. 3,825,422 (1974), the disclosures of which are totally incorporated herein by reference.

EXAMPLE II

Purification of the Dichlorotitanium Phthalocyanine

Six (6.00) grams of dichlorotitanium phthalocyanine prepared by the process described in Example I were added to 200 milliliters of dry dimethylformamide. The suspension was stirred for 15 minutes under argon, filtered through a glass fiber filter (Whatman GF/A grade) and the solid was washed with 100 milliliters of dry dimethylformamide portions, then with 100 milliliters of dry eiher by portions. 5.50 Grams of dichlorotitanium phthalocyanine were obtained after drying under high vacuum.

EXAMPLE III

Synthesis of Type IV Oxytitanium Phthalocyanine 2.2 Grams of dichlorotitanium phthalocyanine prepared by the process described in Example II were added to 20 milliliters of a 1:4 (V/V) mixture of trifluoroacetic acid and methylene chloride and stirring was continued for 15 minutes. The resulting dark green suspension was added dropwise in 20 minutes to 200 milliliters of a vigorously stirred 1:1 (V/V) mixture of methanol and water maintained at 0° to 2° C. The resultant dark blue suspension was stirred at room temperature for an additional 30 minutes and then was filtered through a glass fiber filter (Whatman GF/A grade). The solid resulting was redispersed in 100 milliliters of methanol for 30 minutes, filtered as above, and the resulting solid was slurried in 125 milliliters of deionized boiling water and filtered. After a second boiling water slurry, the Type X oxytitanium phthalocyanine obtained and identified by XRPD was slurried by stirring in 125 milliliters of chlorobenzene for 40 minutes and the resulting Type IV oxytitanium phthalocyanine was separated therefrom by filtration. The solid was dried at 70° C. for 2 hours to yield 1.8 grams (90 percent yield) of Type IV oxytitanium phthalocyanine identified on the basis of its XRPD pattern.

The resulting new crystal Type IV pigment selected for use as a photogenerator in a layered imaging member evidenced a dark decay of 11 volts per second, and an $E_{\frac{1}{2}}$ of 4.6 ergs/$cm^2$ at 780 nanometers. Discharge at 5 and 10 ergs/$cm^2$ was 51 and 62 percent, respectively, at 780 nanometers. The cycle down for this member was 8 percent after 50,000 imaging cycles.

The above Type IV oxytitanium phthalocyanine was evaluated as a photogenerator in xerographic imaging devices which were prepared by the following procedure. An aluminized MYLAR ® substrate (4 mils) was coated with a silane/zirconium oxide solution prepared by mixing 6.5 grams of acetylacetonatetributoxyzirconium, 0.75 gram of (aminopropyl)trimethoxysilane, 28.5 grams of isopropyl alcohol and 14.25 grams of butanol using a number 5 wound wire rod applicator. This layer was dried at 140° C. for 20 minutes; the final thickness was measured to be 0.1 micron. A dispersion of the oxytitanium phthalocyanine was prepared by combining 0.56 gram of the Type IV oxytitanium phthalocyanine and 0.26 gram of poly(vinyl butyral) in 19.7 grams of butyl acetate in a 60 milliliter jar containing 70 grams of 0.8 millimeter glass beads in a paint shaker. The dispersion was shaken for 2 hours, and then was coated onto the silane/zirconium oxide layer described above using a number 6 wound wire rod applicator. The thus formed photogenerating layer was dried at 100° C. for 10 minutes; its final thickness was determined to be about 0.20 micron.

Hole transporting layer solutions were prepared by dissolving 5.4 grams of N,N'-diphenyl-N,N-bis(3-methylphenyl)-1,1'-biphenyl-4,4'-diamine, 8.1 grams of polycarbonate (Z) in 61.5 grams of chlorobenzene. The solution was coated onto the oxytitanium phthalocyanine generator layer using a 10 mil film applicator. The charge transporting layer thus obtained was dried at 115° C. for 60 minutes to provide a final thickness of about 27 microns.

The xerographic electrical properties of the photoresponsive imaging members were determined by electrostatically charging the surface thereof with a corona discharge source until the surface potential as measured by a capacitatively coupled probe attached to an electrometer attained an initial dark value, $V_0$, of $-800$ volts. After resting for 0.5 second in the dark, the charged member reached a surface potential, $V_{ddp}$, or dark development potential. The member was then exposed to filtered light from a Xenon lamp. A reduction in surface potential from $V_{ddp}$ to a background potential, $V_{bg}$, due to the photodischarge effect was observed. The dark decay in volts per second was calculated as $(V_0-V_{ddp})/0.5$. The percent of photodischarge was calculated as $100 \times (V_{ddp}-V_{bg})V_{ddp}$. The half-exposure energy, $E_{\frac{1}{2}}$, the required exposure energy causing reduction of the $V_{ddp}$ to half of its initial value, was determined. The wavelength of incident light selected was 780 nanometers.

EXAMPLE IV

Synthesis of Type IV oxytitanium Phthalocyanine 2.2 Grams of dichlorotitanium phthalocyanine purified by the process described in Example II were hydrolyzed to Type IV oxytitanium phthalocyanine by repeating the procedure described in Example III.

After xerographic evaluation in the imaging member of Example III, there was evidenced a dark decay of 11 volts per second, and an $E_{\frac{1}{2}}$ of 2.4 ergs/cm$^2$ at 780 nanometers. Discharge at 5 and 10 ergs/cm$^2$ was 68 and 76 percent, respectively, at 780 nanometers.

EXAMPLE V

Purification of the Type IV Oxytitanium Phthalocyanine

Two (2.00) grams of oxytitanium phthalocyanine prepared by the process described in Example III were dissolved in 20 milliliters of a 1:4 (V/V) mixture of trifluoroacetic acid and methylene chloride while stirring with a magnetic bar for 10 minutes. The resulting solution was added dropwise over 20 minutes to 200 milliliters of a vigorously stirred precipitation mixture comprised of methanol and water in a 1:1 ratio (V/V) maintained at 0° to 2° C. The mixture was filtered on a Whatman GF/A glass fiber filter and the resulting blue solid was redispersed in 100 milliliters of methanol for 30 minutes, filtered, slurried in 125 milliliters of deionized boiling water for 10 minutes, and refiltered. After a second boiling water wash, the Type X oxytitanium phthalocyanine obtained was identified by XRPD and then slurried in 125 milliliters chlorobenzene for 40 minutes and filtered to yield, after drying at 60° C. under vacuum, 1.8 grams (90 percent yield) of Type IV oxytitanium phthalocyanine, identified by XRPD.

After xerographic evaluation in the imaging members of Example III, there was evidenced a dark decay of 8 volts per second, and an $E_{\frac{1}{2}}$ of 1.8 ergs/cm$^2$ at 780 nonometers. Discharge at 5 and 10 ergs/cm$^2$ was 70 and 74 percent, respectively, at 780 nonometers.

Other modifications of the present invention may occur to those skilled in the art subsequent to a review of the present application. The aforementioned modifications, including equivalents thereof are intended to be included within the scope of the present invention.

What is claimed is:

1. A layered photoconductive imaging member comprised of a supporting substrate, a photogenerating layer comprised of titanyl phthalocyanine photogenerating pigments and thereover a charge transport layer, and wherein said photogenerating pigments are prepared by a process which comprises the formation of a slurry comprised of dihalotitanium phthalocyanine in a mixture comprised of a trihaloacetic acid and an alkylene chloride; adding the resultant slurry to a mixture of an aliphatic alcohol and water enabling hydrolysis whereby Type X oxytitanium phthalocyanine is obtained; separating the Type X oxytitanium phthalocyanine from the slurry; and thereafter subjecting the Type X oxytitanium phthalocyanine obtained to treatment with a halobenzene, followed by the separation of Type IV oxytitanium phthalocyanine photogenerating pigments.

2. An imaging member in accordance with claim 1 with an $E_{\frac{1}{2}}$ equal to about 4.6 ergs/cm$^2$ at 780 nanometers, a dark decay of 11 volts/second, and percent discharge at 5 and 10 ergs/cm$^2$ of 51 and 62 percent, respectively.

3. A process for the preparation of Type IV oxytitanium phthalocycanine consisting essentially of the formation of a slurry comprised of dihalotitanium phthalocyanine in a mixture comprised of a trihaloacetic acid and an alkylene chloride; adding the resultant slurry to a mixture comprised of an aliphatic alcohol and water enabling hydrolysis to obtain Type X oxytitanium phthalocyanine; separating the Type X oxytitanium phthalocyanine from the slurry; and thereafter subjecting the Type X oxytitanium phthalocyanine obtained to treatment with a halobenzene, followed by the separtion of Type IV oxytitanium phthalocyanine.

4. A process in accordance with claim 3 wherein the dihalotitanium phthalocyanine is dichlorotitanium phthalocyanine, the trihaloacetic acid is trifluoroacetic acid, the alkylene halide is methylene chloride, the hydrolysis mixture is comprised of an aliphatic alcohol and water, wherein aliphatic contains from 1 to 6 carbon atoms, and the halobenzene is chlorobenzene.

5. A process in accordance with claim 4 wherein the hydrolysis mixture is comprised of methanol and water in a volume ratio of from about 65 percent of methanol and 35 percent of water to about 35 percent of methanol and 65 percent of water.

6. A process in accordance with claim 4 wherein the resulting oxytitanium phthalocyanine is dried by heating at a temperature of from about 25° C. to about 150° C.

7. A process in accordance with claim 6 wherein vacuum is applied to assist drying.

8. A process in accordance with claim 4 wherein the dihalotitanium phthalocyanine is purified by slurrying in dimethylformamide prior to the formation of the slurry in the trihaloacetic acid and alkylene chloride mixture.

9. A process in accordance with claim 4 wherein the precipitation mixture is comprised of methanol and water in a volume ratio of from about 65 percent of methanol and 35 percent of water to about 35 percent of methanol and 65 percent of water.

10. A process in accordance with claim 3 wherein the halobenzene treatment comprises slurrying the Type X oxytitanium phthalocyanine in chlorobenzene at 25° C. in concentrations ranging from about 1 gram per 10 milliliters to about 1 gram per 100 milliliters for a period of from about 1 minute to about 120 minutes.

11. A process in accordance with claim 3 wherein the hydrolysis mixture is comprised of water and methanol in the volume ratio of from about 65 percent of methanol to about 35 percent of water to about 35 percent of methanol to about 65 percent of water, the dihalotitanium phthalocyanine is dichlorotitanium phthalocyanine, the trihaloacetic acid is trifluoroacetic acid, the alkylene chloride is methylene chloride, and wherein said halobenzene is chlorobenzene.

12. A process in accordance with claim 11 wherein the Type X polymorph obtained is slurried in said halobenzene for a period of time of from 1 minute to 2 hours to insure complete conversion to Type IV titanyl phthalocyanine.

13. A process for the preparation of Type IV oxytitanium phthalocyanine consisting essentially of dissolving Type IV oxytitanium phthalocyanine in a solvent comprises of a trihaloacetic acid and an alkylene halide wherein alkylene contains from 1 to 12 carbon atoms; adding the resultant solution to a mixture of an aliphatic alcohol with 1 to 6 carbon atoms and water which enables precipitation of Type X oxytitanium phthalocyanine; separating the Type X oxytitanium phthalocyanine from the slurry; and thereafter subjecting the Type X oxytitanium phthalocyanine obtained to washing with a halobenzene, followed by the separation of Type IV oxytitanium phthalocyanine.

14. A process in accordance with claim 13 wherein the dihalotitanium phthalocyanine is dichlorotitanium phthalocyanine, the trihaloacetic acid is trifluoroacetic acid, the alkylene halide is methylene chloride, and the halobenzene is chlorobenzene.

15. A process in accordance with claim 13 wherein the aliphatic alcohol is methanol.

16. A process in accordance with claim 13 wherein the dihalotitanium phthalocyanine is dissolved by slurrying in a mixture comprised of 1 volume part of trifluoroacetic acid and from 1 to 20 volume parts of methylene chloride.

17. A process in accordance with claim 13 wherein the precipitation mixture is comprised of methanol and water in volume ratio of from about 65 percent of methanol and 35 percent of water to about 35 percent of methanol and 65 percent of water.

18. A process in accordance with claim 13 wherein the dihalotitanium phthalocyanine is purified by slurrying in dimethylformamide prior to the formation of the slurry in the trihaloacetic acid and alkylene chloride mixture.

* * * * *